(12) United States Patent
Dulac

(10) Patent No.: US 7,343,375 B1
(45) Date of Patent: Mar. 11, 2008

(54) COLLECTION AND CORRELATION OVER TIME OF PRIVATE VIEWING USAGE DATA

(75) Inventor: Stephen P. Dulac, Santa Clarita, CA (US)

(73) Assignee: The DIRECTV Group, Inc., El Segundo, CA (US)

(*) Notice: Subject to any disclaimer, the term of this patent is extended or adjusted under 35 U.S.C. 154(b) by 310 days.

(21) Appl. No.: 10/790,465

(22) Filed: Mar. 1, 2004

(51) Int. Cl.
G06F 17/30 (2006.01)

(52) U.S. Cl. ............................... 707/9; 707/4

(58) Field of Classification Search .............. 707/1–5, 707/9, 104.1, 200; 725/1, 2, 4, 5, 11, 29, 725/100, 105, 110, 139, 151
See application file for complete search history.

(56) References Cited

U.S. PATENT DOCUMENTS

| | | | |
|---|---|---|---|
| 5,630,076 A * | 5/1997 | Saulpaugh et al. | 710/104 |
| 5,790,173 A | 8/1998 | Strauss et al. | |
| 5,802,365 A * | 9/1998 | Kathail et al. | 719/321 |
| 5,819,115 A * | 10/1998 | Hoese et al. | 710/68 |
| 5,872,588 A | 2/1999 | Aras et al. | |
| 6,018,619 A | 1/2000 | Allard et al. | |
| 6,138,119 A | 10/2000 | Hall et al. | |
| 6,236,395 B1 | 5/2001 | Sezan et al. | |
| 6,253,203 B1 | 6/2001 | O'Flaherty et al. | |
| 6,275,824 B1 | 8/2001 | O'Flaherty et al. | |
| 6,308,328 B1 | 10/2001 | Bowcutt et al. | |
| 6,353,929 B1 | 3/2002 | Houston | |
| 6,389,593 B1 | 5/2002 | Yamagishi | |
| 6,427,140 B1 | 7/2002 | Ginter et al. | |
| 6,785,805 B1 * | 8/2004 | House et al. | 713/1 |
| 6,971,018 B1 * | 11/2005 | Witt et al. | 713/187 |
| 6,976,252 B2 * | 12/2005 | White et al. | 717/174 |
| 2003/0158960 A1 * | 8/2003 | Engberg | 709/237 |
| 2003/0217192 A1 * | 11/2003 | White et al. | 709/321 |
| 2004/0215754 A1 * | 10/2004 | Orleth et al. | 709/223 |

* cited by examiner

Primary Examiner—Cheryl Lewis

(57) ABSTRACT

A method, apparatus and article of manufacture for collecting, storing and processing usage data from a device. Usage data is extracted from the device, wherein the usage data is associated with a customer identifier. The customer identifier is obfuscated, but not eliminated, from the extracted usage data. The extracted usage data is then correlated over a period of time using the obfuscated customer identifier.

24 Claims, 3 Drawing Sheets

COLLECTION AND CORRELATION OVER TIME OF PRIVATE VIEWING USAGE DATA

BACKGROUND OF THE INVENTION

1. Field of the Invention

The present invention relates to the collection and correlation over time of private viewing usage data.

2. Description of the Related Art

The collection, storage and processing of viewing usage data provides valuable information to multi-channel video distributors. By understanding its customers' viewing habits and programming preferences, a distributor can increase revenues by offering them more desirable programming and more interesting advertisements. Furthermore, other companies (such as advertisers, programming providers and television networks) are willing to pay for audience measurement data, representing additional revenue sources for the distributor.

The privacy of customers is of paramount concern when handling viewing usage data. A company has legal and ethical obligations to honor its customers' wishes with respect to the privacy of their viewing usage data. One privacy policy model places customers into three categories: those who specifically request that their viewing usage data not be used ("opt-out"), those who specifically allow use of their viewing usage data ("opt-in"), and those who have stated no preference ("opt-neutral").

A company is free to use incentives to encourage its customers to adopt "opt-in" status; however, without any incentives, the majority of customers will end up in the "opt-neutral" category. While laws in different regions of the country differ, one may assume that viewing usage data for "opt-neutral" customers may be used for aggregate viewing usage analyses only, and is required to be stored in a way that prevents an individual customer's viewing usage data to be extracted at any time.

The simplest way to meet this requirement is to remove the customer identifier prior to storage of the data. However, by doing this, the data cannot be correlated across multiple data samples received over time.

For example, assume that the viewing usage data sent at the end of Week 1 shows that 10% of "opt-neutral" customers viewed the first episode of a new series the previous night and viewing usage data sent at the end of Week 2 shows that 15% of "opt-neutral" customers viewed the second episode of that new series during Week 2. If the viewing usage data is not indexed by a customer identifier, then the distributor cannot determine how many customers viewed both episodes, or what types of customers viewed the first but not the second episode.

Consequently, there is need for the ability to collect and correlate private viewing usage data over time, while maintaining the privacy of customers. The present invention satisfies that need.

SUMMARY OF THE INVENTION

The present invention discloses a method, apparatus and article of manufacture for collecting, storing and processing usage data from a device. Usage data is extracted from the device, wherein the usage data is associated with a customer identifier. The customer identifier is obfuscated, but not eliminated, from the extracted usage data. The extracted usage data is then correlated over a period of time using the obfuscated customer identifier.

The usage data is processed in accordance with a privacy policy recorded for each customer. In this regard, both the customer identifier and the usage data are stored for "opt-in" customers, only the obfuscated customer identifier and the usage data are stored for "opt-neutral" customers, and neither the customer identifier or the usage data are stored for "opt-out" customers.

The obfuscation of the customer identifier is performed only for extracted usage data associated with an "opt-neutral" customer. The obfuscation comprises creating a replacement identifier for the customer identifier from the extracted usage data. The replacement identifier is created by translating the customer identifier from the extracted usage data into the replacement identifier. The customer identifier is translated by performing a translation function that either produces a unique replacement identifier for every customer identifier or produces a non-unique replacement identifier for every customer identifier. Preferably, the translation function is a one-way translation function that has an inverse function that is difficult to perform.

The device may send the viewing usage data along with a usage identifier that is independent of the customer identifier. In this situation, the obfuscating of the customer identifier comprises translating the customer identifier from the extracted usage data into a replacement identifier using the usage identifier.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings that form a part hereof, and which show, by way of illustration, embodiments of the present invention. It is understood that other embodiments may be utilized and structural changes may be made without departing from the scope of the present invention.

Overview

The present invention is directed to the collection, storage and processing of viewing usage data that allows it to be correlated across time, while at the same time preserving the privacy of the person generating the viewing usage data. The present invention obfuscates, but does not eliminate, an identifier associated with the viewing usage data. This is an improvement over existing methods of deleting identifiers from collected viewing usage data, which then makes it impossible to correlate the viewing usage data over any extended period of time. With the present invention, a replacement identifier is created that may be used to reference the viewing usage data collected over time and allow correlated analyses to be performed.

Video Distribution System

Figure 1:
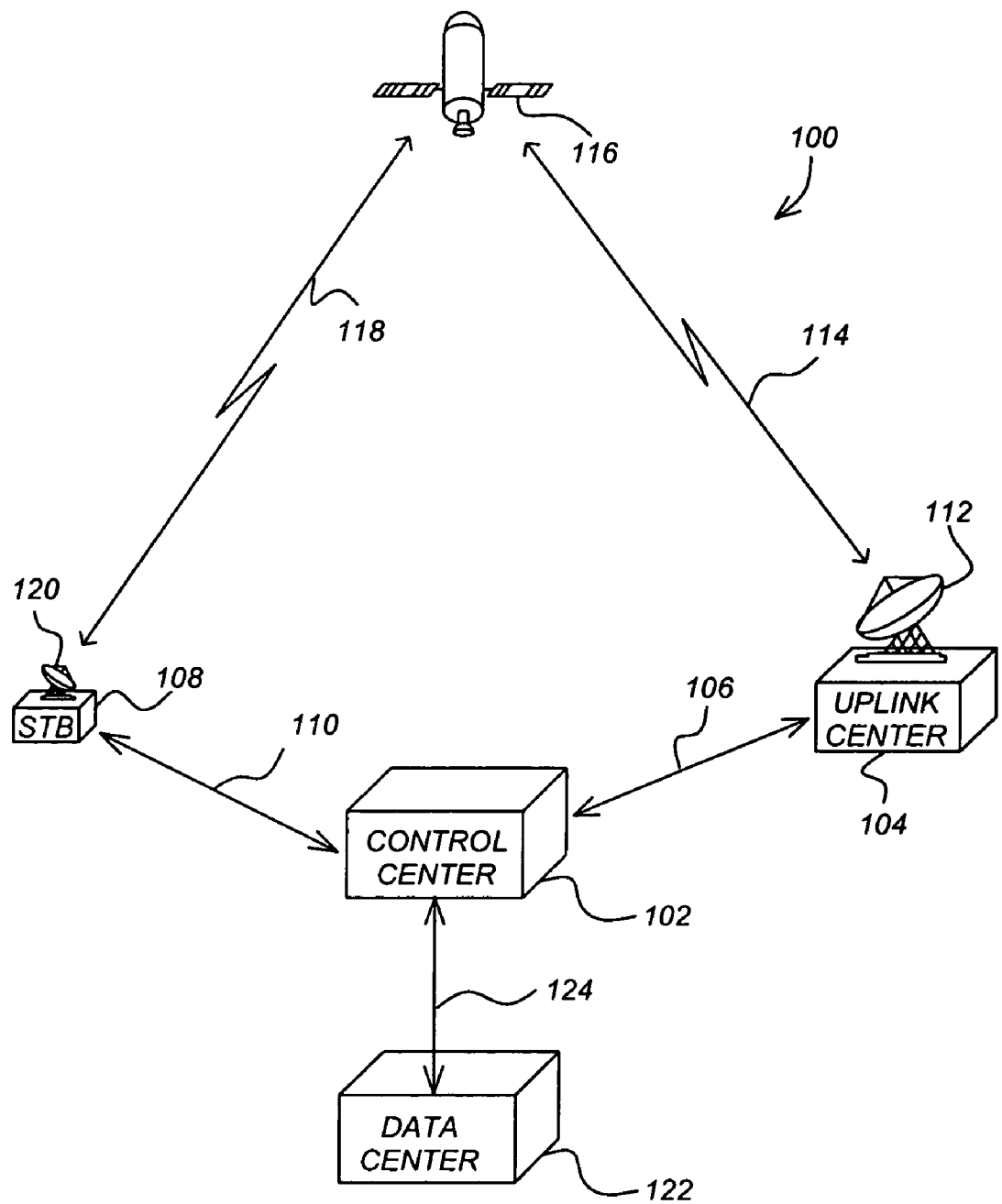
FIG. 1 is a diagram illustrating an overview of a video distribution system according to a preferred embodiment of the present invention.

FIG. 1 is a diagram illustrating an overview of a video distribution system 100 according to a preferred embodiment of the present invention. The video distribution system 100 comprises a control center 102 in communication with an uplink center 104 via a link 106 and with subscriber receiving devices 108, also known as STBs (Set Top Boxes)

or IRDs (Integrated Receiver Decoders), via a link 110. The control center 102 provides program material to the uplink center 104, and coordinates with the STBs 108 to collect viewing usage data, among other functions.

The uplink center 104 receives the program material from the control center 102 and, using an uplink antenna 112, transmits 114 the program material to one or more satellites 116, each of which may include one or more transponders. The satellites 116 receive and process this information, and transmit 118 the program material to the STBs 108, which receive this information using an antenna 120.

The STBs 108 collect and store viewing usage data, as well as other subscriber-related data. The viewing usage data is periodically extracted from the STB 108 and transmitted to the control center 102 via link 110. The control center 102, in turn, passes the viewing usage data onto a data center 122 via link 124, wherein the data center 122 processes the viewing usage data as described in more detail below.

While the invention disclosed herein will be disclosed with reference to a satellite based video distribution system 100, the present invention may also be practiced with terrestrial-based video distribution system, whether by antenna, cable, or other means. Further, the different functions collectively allocated among the various components as described above can be reallocated as desired without departing from the intended scope of the present invention.

Data Center

Figure 2:
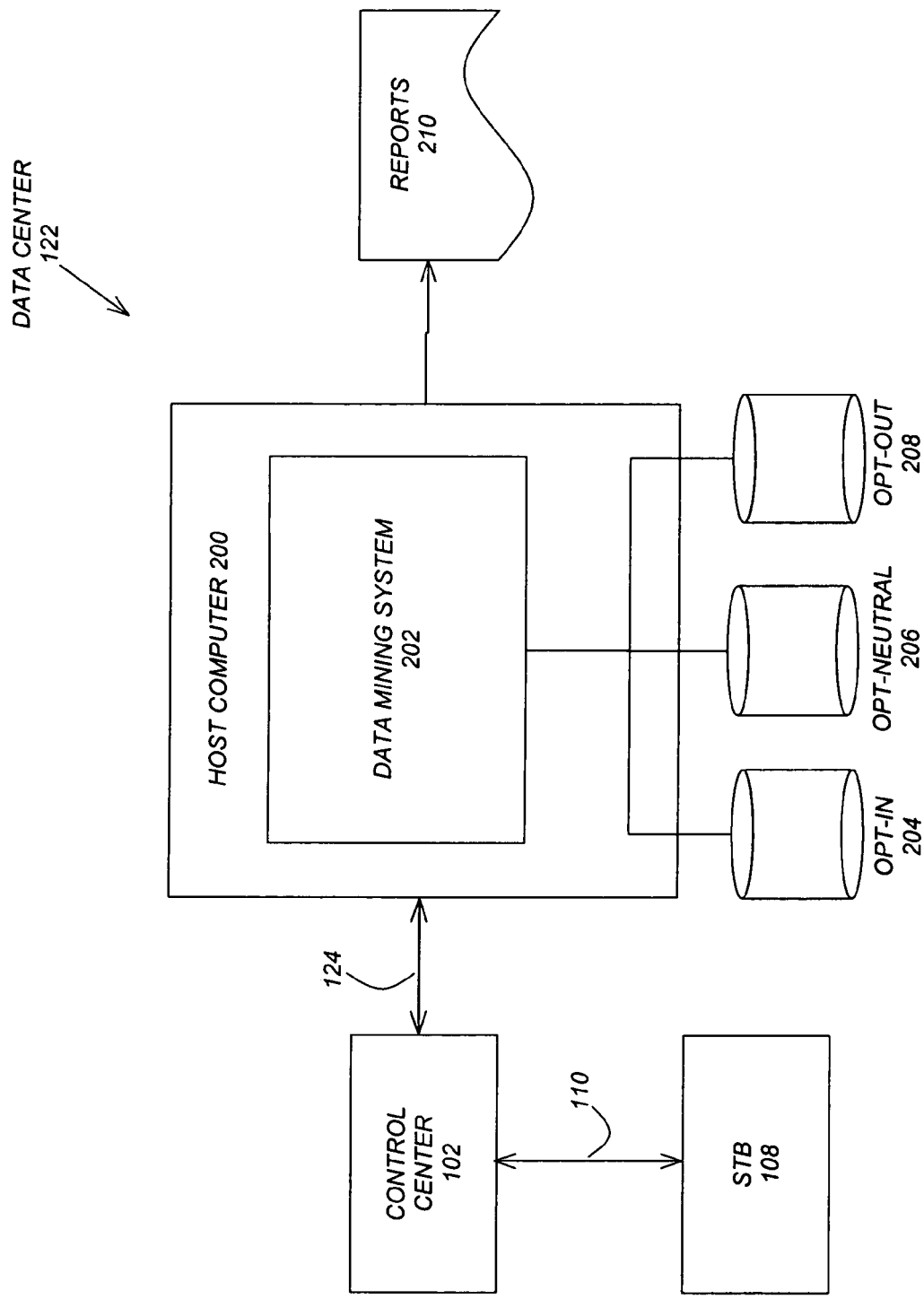
FIG. 2 is a diagram illustrating a data center according to the preferred embodiment of the present invention.

FIG. 2 is a diagram illustrating the data center 122 according the preferred embodiment of the present invention. The data center 122 includes one or more host computers 200 that execute a data mining system 202. The data mining system 202 receives the viewing usage data from one or more STBs 108, stores the data in one or more databases, such as an "opt-in" database 204, "opt-neutral" database 206 and "opt-out" database 208, and then processes the data in order to provide information for reports 210, for the control center 102, or for other systems.

The STB 108 is programmed to collect viewing usage data (such as remote control clicks or channel number and date/time). Generally, the viewing usage data can include any data that the STB 108 may be able to collect (and not only data associated with the actual viewing of video programs).

A data collector function performed by the data mining system 202 processes the viewing usage data in accordance with a privacy policy recording for each customer. In accordance with methods for maintaining privacy of viewing usage data, a customer identifier and the viewing usage data is stored for "opt-in" customers, while only the viewing usage data is stored for "opt-neutral" customers. The total of "opt-in" and "opt-neutral" viewing usage data may be stored in separate databases, as depicted in FIG. 2, or stored in a single shared database. Finally, data for the "opt-out" customers may not be collected at all, or may be collected but stored only temporarily before being deleted.

The data mining system 202 also manages any control messages related to viewing usage data collection that are delivered to each STB 108, wherein the control messages may be delivered by the uplink center 104 (via link 114, satellite 116 and link 118) or may be delivered via link 110. Moreover, viewing usage data for "opt-out" customers may never be transferred to the data mining system 202, instead of being transferred and then deleted, if the STB 108 obtains knowledge of its "opt-out" status through a control message.

Staff responsible for reporting on the viewing usage data operate the data mining system 202 through user control terminals. This staff provides data manipulation and reporting instructions to the data mining system 202, which then generates the required reports 210.

Operation of the Present Invention

The following describes the operation of the present invention. Specifically, the following describes various methods used by the data mining system 202 for maintaining customer privacy while collecting and correlating the viewing usage data over time.

One method to meet both the requirement for privacy and the requirement for data correlation across multiple data samples received over time is for a data collection function of the data mining system 202 to translate a customer identifier into another replacement identifier ("Translated Customer Identifier") and store the viewing usage data along with the replacement identifier. A translation function performed by the data mining system 202 should ideally be 1:1 (i.e., producing a unique replacement identifier for every customer identifier provided to the function). If the translation function is not 1:1, then additional uncertainty is introduced. Such uncertainty may be acceptable, or alternatively, the data mining system 202 may identify and delete viewing usage data in which the same result occurs from translation.

However, this method might not meet the requirements of privacy advocates who assert that it could be very straightforward for a hacker to reverse engineer the translation function, restoring the customer identifier and, as a result, recreating the association of viewing usage data with the customer identifier. For example, by knowing the viewing usage data and customer identifiers for a number of customers, a hacker could identify the associated translated numbers. With enough of these examples, an inverse translation function could be developed and the customers' privacy might then be compromised.

A modification that improves upon the "Translated Customer Identifier" method is to use one-way functions for the aforementioned translations. A one-way function is a mathematical function that is significantly easier to perform in one direction (the forward direction from the customer identifier to the replacement identifier) than in the opposite direction (the inverse direction from the replacement identifier to the customer identifier). Whereas the forward translation could be computed in seconds, the inverse translation might take months or years to compute. Using one-way functions, the calculation by hackers of an inverse translation function would become impractical.

Other improvements may be made to the "Translated Customer Identifier" method. Like existing techniques, services are sent to the STB 108 while the viewer controls the STB 108 and employs the services. The STB 108 collects the viewing usage data, which is later transferred to the data mining system 202. In the case of the "opt-neutral" customer, the data collector function of the data mining system 202 translates the customer identifier to a replacement identifier and stores only the replacement identifier with the viewing usage data. As discussed earlier, the translation function may be a one-way mathematical function. Staff responsible for reporting on the viewing usage data are then able to perform correlatable viewing usage reporting over time, due to the ability to key off the replacement identifier stored in the database 206.

A second method that meets both requirements has the STB 108 sending the viewing usage data along with an unchanging additional identifier (i.e. a "Viewing Usage Identifier") that is independent of any customer identifier. This viewing usage identifier could be generated by the STB 108 or entered into the STB 108 by any of a variety of methods (e.g., during manufacture of the STB 108). With this method, no inverse translation function would exist for hackers to calculate. At the same time, this method may not be 1:1, so it introduces a possibility that multiple receivers use the same viewing usage identifier. This possibility could be made very small, however.

A drawback of the "Viewing Usage Identifier" method is that it does not necessarily allow for the data mining system 202 to correlate other customer data such as geographic location with the viewing usage data. This may reduce the value of the viewing usage data to the distributor.

Improvements may also be made to the "Viewing Usage Identifier" method. For example, the STB 108 may be informed, via a control message, of its privacy status. Note that a default status may be assumed by the STB 108 that may be overridden by the control message. When the privacy status is "opt-neutral", "the STB 108 transfers its viewing usage data along with a viewing usage identifier to the data mining system 202. When the privacy status is "opt-in"," the STB 108 transfers its viewing usage data along with a customer identifier (e.g., a customer ID, STB 108 ID, or conditional access module ID) to the data mining system 202, which the data mining system 202 can use to identify the customer. The data collector function of the data mining system 202 stores this transferred data in the appropriate database 204, 206 or 208.

Alternatively, the STB 108 need not be informed of its privacy status. In the event that the STB 108 is unaware of its privacy status (i.e., its privacy status is "unknown"), the STB 108 may transfer its viewing usage data along with both a viewing usage identifier and a customer identifier to the data mining system 202. In this embodiment, the data collector function of the data mining system 202 removes the customer identifier from the viewing usage data sent by the "opt-neutral" STB 108, storing only the viewing usage identifier in the database 206. In this embodiment, the data collector function of the data mining system may optionally remove the viewing usage identifier from the viewing usage data sent by the "opt-in" STB 108 as well. One reason for not removing the viewing usage identifier from the viewing usage data sent by the "opt-in" STB 108 is to allow a customer's previously received data to be moved into the "opt-neutral" database 206 if that customer chooses to change their privacy status from "opt-in" to "opt-neutral."

Logic of the Present Invention

Figure 3:
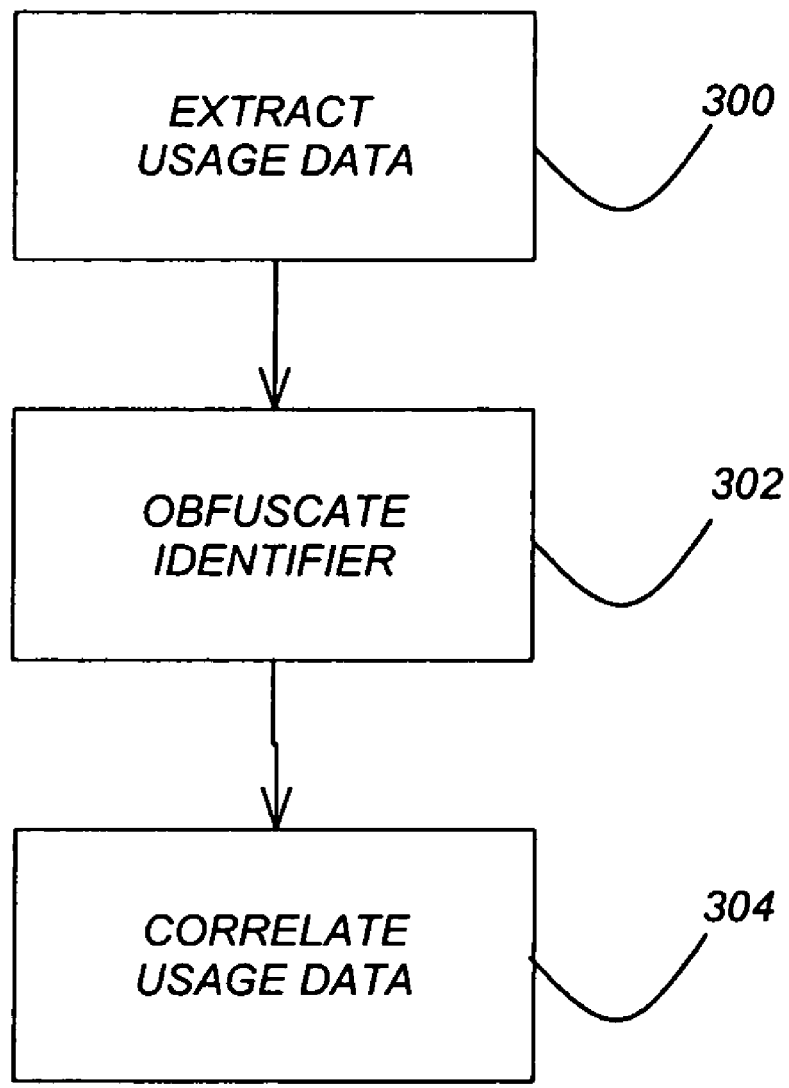
FIG. 3 is a flowchart that illustrates the logic performed by a preferred embodiment of the present invention.

FIG. 3 is a flowchart that illustrates the logic performed by a preferred embodiment of the present invention.

Block 300 represents extracting usage data from a device, wherein the usage data is associated with a customer identifier and is processed in accordance with a privacy policy recorded for each customer.

Block 302 represents obfuscating, but not eliminating, the customer identifier from the extracted usage data. The obfuscating step is performed only for extracted usage data associated with an "opt-neutral" customer, i.e., both the customer identifier and the usage data are stored for "opt-in" customers, only the obfuscated customer identifier and the usage data are stored for "opt-neutral" customers, and neither the customer identifier nor the usage data are stored for "opt-out" customers.

In Block 302, the obfuscating step comprises creating a replacement identifier for the customer identifier from the extracted usage data. Specifically, the obfuscating step comprises translating the customer identifier from the extracted usage data into the replacement identifier.

This translating step may comprise performing a translation function that produces a unique replacement identifier for every customer identifier, or the translating step may comprise performing a translation function that produces a non-unique replacement identifier for every customer identifier. Further, the translating step may comprise performing a one-way translation function that has an inverse function that is difficult to perform.

In an alternative embodiment, a usage identifier that is independent of the customer identifier is extracted from the device along with the usage data, and the obfuscating step comprises translating the customer identifier from the extracted usage data into a replacement identifier using the usage identifier.

Block 304 represents correlating the extracted usage data over a period of time using the obfuscated customer identifier.

CONCLUSION

The foregoing description of the preferred embodiment of the invention has been presented for the purposes of illustration and description. It is not intended to be exhaustive or to limit the invention to the precise form disclosed. Many modifications and variations are possible in light of the above teaching.

For example, while the foregoing disclosure presents an embodiment of the present invention as it is applied to viewing usage data, the present invention can be applied to any type of usage data and any application that analyzes usage data. Moreover, although the present invention is described in terms of specific systems and functions, it could also be applied to other systems and functions. Finally, although specific logic is described herein, those skilled in the art will recognize that other logic may accomplish the same result, without departing from the scope of the present invention.

It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer implemented method of collecting, storing and processing usage data from a device, comprising:
    collecting, storing and processing usage data from the device in accordance with a privacy policy by:
        extracting the usage data from the device, wherein the usage data is associated with a customer identifier;
        translating the customer identifier from the extracted usage data into a replacement identifier when the customer is an "opt-neutral" customer;
        correlating the extracted usage data over a period of time using the customer identifier or replacement identifier; and
        using the correlated usage data to understand the customer's preferences and thereby increase revenue;
        wherein both the customer identifier and the usage data are stored for "opt-in" customers, only the replacement identifier and the usage data are stored for "opt-neutral" customers and neither the customer identifier nor the usage data are stored for "opt-out" customers; and wherein the "opt-out" customers are those who specifically request that their usage data not be used, the "opt-in" customers are those who specifically allow use of their usage data and the "opt-neutral" customers are those who have stated no preference.

2. The method of claim 1, wherein the translating step is performed only for extracted usage data associated with an "opt-neutral" customer.

3. The method of claim 1, wherein the translating step comprises creating the replacement identifier for the customer identifier from the extracted usage data.

4. The method of claim 1, wherein the translating step comprises performing a translation function that produces a unique replacement identifier for every customer identifier.

5. The method of claim 1, wherein the translating step comprises performing a translation function that produces a non-unique replacement identifier for every customer identifier.

6. The method of claim 1, wherein the translating step comprises performing a one-way translation function that has an inverse function that is difficult to perform.

7. The method of claim 1, wherein the device sends the usage data along with a usage identifier that is independent of the customer identifier.

8. The method of claim 7, wherein the translating step comprises translating the customer identifier from the extracted usage data into the replacement identifier using the usage identifier.

9. A computer implemented apparatus for collecting, storing and processing usage data from a device, comprising:
means for collecting, storing and processing usage data from the device in accordance with a privacy policy by:
extracting the usage data from the device, wherein the usage data is associated with a customer identifier;
translating the customer identifier from the extracted usage data into a replacement identifier when the customer is an "opt-neutral" customer;
correlating the extracted usage data over a period of time using the customer identifier or replacement identifier; and
using the correlated usage data to understand the customer's preferences and thereby increase revenue;
wherein both the customer identifier and the usage data are stored for "opt-in" customers, only the replacement identifier and the usage data are stored for "opt-neutral" customers and neither the customer identifier nor the usage data are stored for "opt-out" customers; and
wherein the "opt-out" customers are those who specifically request that their usage data not be used, the "opt-in" customers are those who specifically allow use of their usage data and the "opt-neutral" customers are those who have stated no preference.

10. The apparatus of claim 9, wherein the translating is performed only for extracted usage data associated with an "opt-neutral" customer.

11. The apparatus of claim 9, wherein the translating comprises creating the replacement identifier for the customer identifier from the extracted usage data.

12. The apparatus of claim 9, wherein the translating comprises performing a translation function that produces a unique replacement identifier for every customer identifier.

13. The apparatus of claim 9, wherein the translating comprises performing a translation function that produces a non-unique replacement identifier for every customer identifier.

14. The apparatus of claim 9, wherein the translating comprises performing a one-way translation function that has an inverse function that is difficult to perform.

15. The apparatus of claim 9, wherein the device sends the usage data along with a usage identifier that is independent of the customer identifier.

16. The apparatus of claim 15, wherein the translating comprises translating the customer identifier from the extracted usage data into the replacement identifier using the usage identifier.

17. An article of manufacture comprising a computer program storage media storing instructions that, when read and executed by a computer, causes the computer to perform a method for collecting, storing and processing usage data from a device, comprising:
collecting, storing and processing usage data from the device in accordance with a privacy policy by:
extracting the usage data from the device, wherein the usage data is associated with a customer identifier;
translating the customer identifier from the extracted usage data into a replacement identifier when the customer is an "opt-neutral" customer;
correlating the extracted usage data over a period of time using the customer identifier or replacement identifier; and
wherein both the customer identifier and the usage data are stored for "opt-in" customers, only the replacement identifier and the usage data are stored for "opt-neutral" customers and neither the customer identifier nor the usage data are stored for "opt-out" customers; and
wherein the "opt-out" customers are those who specifically request that their usage data not be used, the "opt-in" customers are those who specifically allow use of their usage data and the "opt-neutral" customers are those who have stated no preference.

18. The article of claim 17, wherein the translating step is performed only for extracted usage data associated with an "opt-neutral" customer.

19. The article of claim 17, wherein the translating step comprises creating the replacement identifier for the customer identifier from the extracted usage data.

20. The article of claim 17, wherein the translating step comprises performing a translation function that produces a unique replacement identifier for every customer identifier.

21. The article of claim 17, wherein the translating step comprises performing a translation function that produces a non-unique replacement identifier for every customer identifier.

22. The article of claim 17, wherein the translating step comprises performing a one-way translation function that has an inverse function that is difficult to perform.

23. The article of claim 17, wherein the device sends the usage data along with a usage identifier that is independent of the customer identifier.

24. The article of claim 23, wherein the translating step comprises translating the customer identifier from the extracted usage data into the replacement identifier using the usage identifier.

* * * * *